United States Patent
Kirschner

[15] 3,636,321
[45] Jan. 18, 1972

[54] AIRCRAFT REFERENCE PROGRAM GENERATOR

[72] Inventor: Robert K. Kirschner, Bellevue, Wash.
[73] Assignee: Sundstrand Data Control, Inc.
[22] Filed: Dec. 10, 1969
[21] Appl. No.: 883,852

[52] U.S. Cl..................235/150.2, 235/150.22, 235/197, 244/77 D, 244/77 F
[51] Int. Cl..........................G06g 7/26, G06g 7/78
[58] Field of Search............244/77 D, 77 F; 235/150.2, 235/150.22

[56] References Cited

UNITED STATES PATENTS 3,241,792  3/1966  Hattendorf...................244/77 D

Primary Examiner—Malcolm A. Morrison
Assistant Examiner—R. Stephen Dildine, Jr.
Attorney—Hofgren, Wegner, Allen, Stellman & McCord

[57] ABSTRACT

An analog position transducer connected to an aircraft flap generates a linear voltage representing flap position. Separate switching stages are responsive to different potential levels of the linear voltage to produce separate output waveforms which are summed by an operational amplifier for each reference program which is to be generated. The disclosed reference programs correlate desired angle of attack to flap position for an aircraft approach program and a climbout program.

12 Claims, 2 Drawing Figures

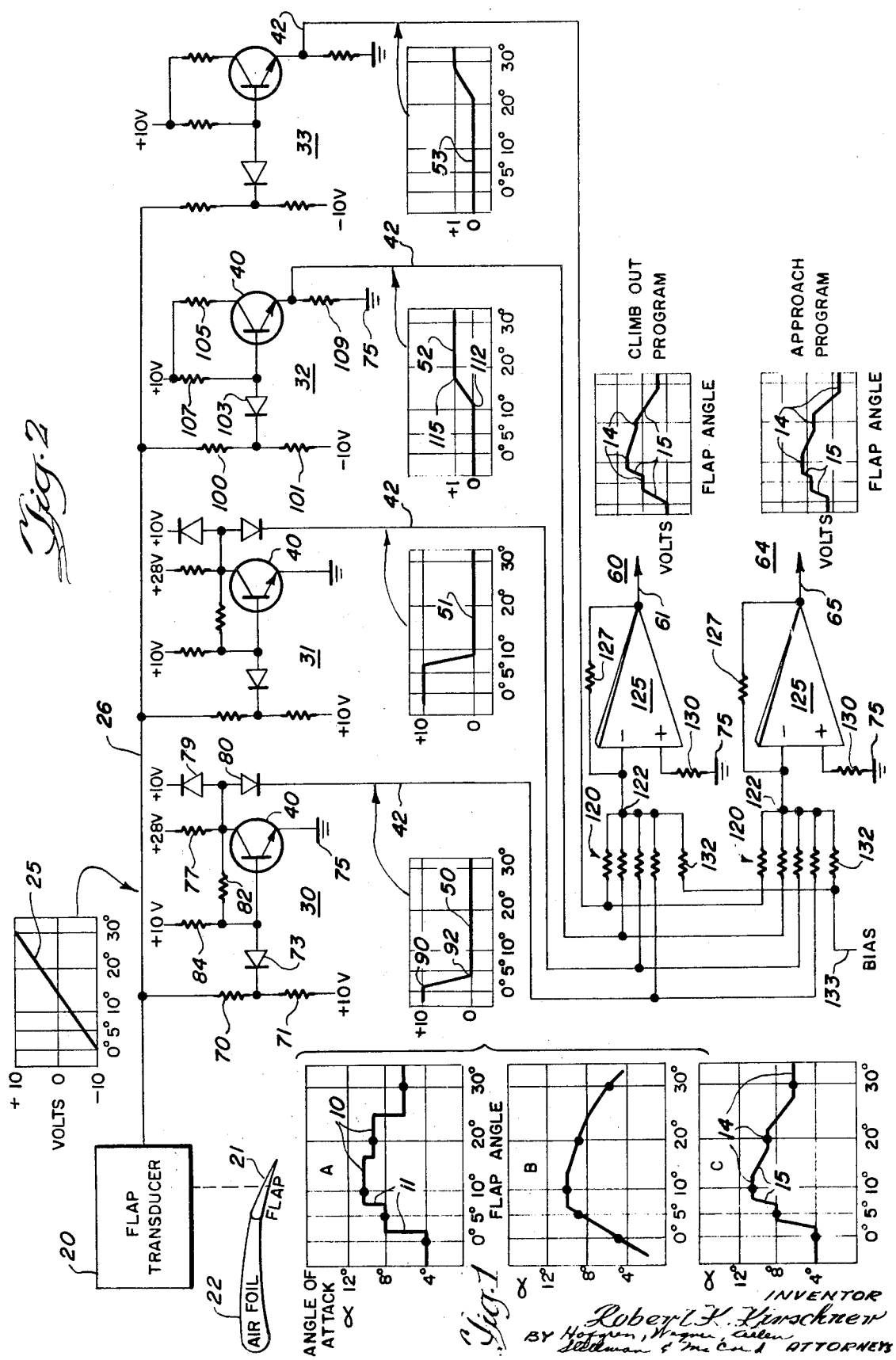

AIRCRAFT REFERENCE PROGRAM GENERATOR

This invention relates to an aircraft reference program generator for producing a reference program correlating the position of an aircraft control surface with a desired aircraft flight condition.

In aircraft control systems, reference generators correlate the position of control surfaces to a desired aircraft flight condition for comparison with the actual aircraft flight condition to provide an input to an automatic control system or a pilot display. For example, a reference program generator may correlate flap position with desired angle of attack. Often, separate programs are generated for different flight routines, such as for climbout and approach.

Flap position with respect to an airfoil is usually constrained to certain discrete values, such as 0°, 5°, 10°, 20°, etc. During the transition period between discrete flap positions, the output command from prior reference generators experience a discontinuity or jump which requires special smoothing circuitry to prevent undesired system response. In addition to adding to the complexity of the reference generator, the smoothing circuitry does not produce a reference program which faithfully represents flap position during flap transition periods.

In a typical prior flap position transducer, mechanical switches are linked to the flap for actuation during each transition of the flap between discrete flap positions. When a conventional reference program generator is connected to the mechanical switches, the resulting program output has undesirable stepped transitions during the transition periods. Between the transition periods, however, a flat plateau region is formed which is desirable in that there is a lack of ambiguity in the flap signal even when there is minor mislocations of the flap within the flap position tolerance band. It would be desirable to retain the generation of flat plateau regions while eliminating the disadvantages of prior systems. For example, the mechanical switches forming a flap position transducer have a low reliability and undesirable weight and cost when the switches are located in an aircraft wing in order to sense true flap position. Also, smoothing circuitry produces a reference program which does not truly represent flap position between discrete position values.

In accordance with the present invention, an improved reference program generator is disclosed which retains the advantages of prior systems, while eliminating the disadvantages. An analog linear position transducer is connected to a flap in order to provide a continuous flap position signal with smoothly varying values during flap changes. In place of prior reference program generators, an electronic function generator is used which provides smooth analog transitions in the reference program during flap changes. In addition, the function generator has dwell or plateau regions for each flap position, which can be tailored to a specific aircraft to accommodate variations in flap position accuracy. The present invention can generate as many separate reference programs as required, as for approach and for climbout, without requiring a corresponding increase in the number of parts forming the generator.

While the applicant's reference program generator is illustratively disclosed for forming an angle of attack program for discrete flap positions, the program generator is equally usable for generating any reference program correlating the position of a control surface of an aircraft to a desired aircraft flight condition. Many control surfaces other than flaps may be used with the reference generator, including movable wing surfaces such as used in STOL and VTOL aircraft, as well as other control surfaces.

One feature of this invention is the provision of an aircraft reference program generator for correlating a desired aircraft flight condition to the position of a control surface connected to an analog linear position transducer.

Another feature of this invention is the provision of an aircraft reference program generator having a minimum number of components for generating plural reference programs, each of which is tailored to a different flight routine.

Further features and advantages of the invention will be apparent from the following specification, and from the drawings, in which:

FIGS. 1A, 1B and 1C show three forms of reference programs generated by different types of reference program generators; and FIG. 2 is a partly block and partly schematic diagram of the invention.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

In FIG. 1, three reference programs correlating angle of attach to flap position are illustrated in order to illustrate how the applicant's generator eliminates the disadvantages of prior generators while retaining the advantages thereof. In all three parts of the diagram, the same basic program has been generated to provide specific angle of attack values for specific discrete flap positions of 0°, 5°, 10°, 20° and 30°. For convenience, the intersection of the discrete flap position values with the generated program curve are indicated by small circles.

FIG. 1A illustrates a reference program generated by a typical prior reference generator using a mechanical switch flap position transducer. For each discrete flap position, a flat plateau region 10 of the program curve desirably provides a nonambiguous value of desired angle of attack. However, during the period of flap transition, the generated curve has an undesirable perpendicular discontinuity region 11 while the curve jumps between adjacent plateau regions 10. The regions 11 have substantially 90° corners at both the start and termination of the transition time. The resulting sharp discontinuities require special smoothing circuitry to avoid a discontinuity in a system output command.

The reference program generated by the preferred form of the present invention is illustrated in FIG. 1C. The curve has dwell or plateau regions 14 which, like the regions 10 in FIG. 1A, provide nonambiguous values of angle of attack. Unlike FIG. 1A, the transition regions 15, between the plateaus 14, have a smooth analog ramp or skewed shape in which the corners or points of discontinuity are not perpendicular, but rather have an angle other than 90°. The skewed transition regions 15 desirably provide an unambiguous angle of attack signal for each value of flap position, including flap positions between discrete values.

In FIG. 2, a preferred form of the reference program generator is illustrated, which generates the reference program shown in FIG. 1C. A transducer 20 is connected to a movable control surface in an aircraft, such as a flap 21 movable with respect to an airfoil 22. Transducer 20 may be any suitable position responsive transducer having an analog output with a continuously variable quantity representing the actual position of the connected movable element. A suitable transducer 20 would be one having a voltage output 25 such as illustrated by the chart in FIG. 2. The voltage output 25 smoothly and continuously varies from −10 volts DC3 at 0° flap position, to +10 volts DC at 30° flap position. This voltage is coupled over a transducer output line 26 to a switching means with four stages 30, 31, 32, and 33. The number of stages is equal to the number of transitions between discrete flap positions. Since there are five discrete flap positions, namely 0°, 5°, 10°, 20° and 30°, there are four transition regions and hence four stages 30–33.

Each switching stage contains a controllable conduction device, such as an NPN-transistor 40, connected to form a switching circuit having an output voltage on an output line 42. The voltage outputs for each of the individual stages 30 to 33 are illustrated by the curves 50 t0 53, respectively. Each stage switches at a different voltage level from transducer output line 26, thereby producing four separate switching waveforms.

By way of example, it will be assumed that a particular aircraft type requires that a separate climbout reference program and a separate approach reference program be generated with values tailored to the flight characteristics of that aircraft. For this situation, a first summer 60 combines the separate switching waveforms 50–53 from stages 30–33 in a selected weighted manner to generate, on an output line 61, a climbout program. A second summer 64 combines the switching waveforms 50–53 from the stages 30–33 with different weights in order to produce, on an output line 65, an approach program. As many additional summers may be provided as are necessary for the number of separate programs to be generated; however, only a single set of switching stages 30–33 are necessary. The reference programs on lines 61 and 65 may be connected in a conventional manner with a known comparison circuit having another input representing actual angle of attack. The difference between the reference angle of attack and the actual angle of attach may be used to generate an error signal input to either an automatic speed/altitude control system and/or a pilot display, as is conventional.

Considering the circuit of FIG. 2 in more detail, switching stages 30 and 31 use identical circuits with different values of components in order to produce the separate switching waveforms 50 and 51. Only the stage 30 will be explained in detail, it being understood that the stage 31 operates in a similar manner.

To connect transistor 40 in stage 30 to transducer output line 26, a pair of voltage-divider resistors 70 and 71 are connected in series between line 26 and a source of +10 volts DC potential. The junction between resistors 70 and 71 is connected through a diode 73 to the base of transistor 40. The emitter of transistor 40 is connected directly to a source of reference potential or ground 75. In the circuit, all positive and negative DC-potentials are referenced to ground 75. Any conventional DC-power supply may be used to produce the output voltages indicated in the drawing.

The collector of transistor 40 is connected through a resistor 77 to +28 volts DC and also through a diode 79 to +10 volts DC. A second diode 80, poled in the same direction as diode 79, is connected between the collector of transistor 40 and output line 42 for stage 30. The collector of the transistor is also connected through a feedback resistor 82 to the base electrode, and the junction between resistor 82 and the base electrode is connected through a biasing resistor 84 to +10 volts DC.

The operation of stage 30 may be understood by referring to the voltage curve 50 which is generated on output line 42. Transistor 40 is biased into its nonconducting region for transducer voltages on line 26 more negative than −9 volts or so. During this time, the junction between resistor 70 and 71 is at zero or a slight positive voltage, sufficient to allow diode 73 to remain conductive by the current path from +10 volts and resistor 84 to the anode of the diode.

As the voltage on line 26 rises above this switching point, as occurs at a point 90 on the voltage curve 50, diode 73 becomes nonconductive, unclamping the base electrode from its prior substantially ground potential, causing transistor 40 to be driven into its conducting region. The collector electrode, previously clamped at approximately +10 volts (minus the voltage drop through the conduction diode 79), now begins to drop in potential as the collector to emitter resistance of the transistor forms a voltage divider with resistor 77. The diode 80 passes the positive voltage at the collector electrode, producing the voltage curve 50 on line 42.

Transistor 40 will continue to be driven more conductive until it reaches its saturation level which substantially clamps the collector electrode to ground potential, as corresponds to a point 92 on curve 50. The transition period between points 90 and 92 is located between the discrete flap positions of 0° and 5°, and the ramp-shaped voltage between points 90 and 92 is used to form the first transition period 15 in the reference programs. Desirably, the ramp region between points 90 and 92 has a lesser extent than the transducer voltage region from one discrete flap position to the next discrete flap position, in order to form the plateau regions 14 which provide the unambiguous indication of discrete flap positions.

Stage 30 is compensated for temperature effects by the diode 80 which is chosen to have the same temperature curve as diode 79. Thus, variations in the voltage drop across the clamping diode 79 are compensated for by the corresponding variations occurring in the voltage drop across diode 80. The selection of the values of DC-supply potentials and the values of the resistors control the steady state levels of the curve 50 and the location of points 90 and 92. For stage 30, the ramp between points 90 and 92 is chosen to occur during the first transition period between the discrete flap positions of 0° and 5°. For stage 31, the voltage divider resistors 70 and 71 are chosen to have different values so that the ramp for curve 51 occurs between the next discrete flap positions of 5° and 10°. Otherwise, the stage 31 operates in the same manner as stage 30.

Switching stages 32 and 33 use a different circuit to form switching voltages 52 and 53, respectively, which voltages are generally inverse to those produced by stages 30 and 31. The circuits for stages 32 and 33 are identical, with different component values being used to vary the point of switching. Only stage 32 will be explained in detail.

A pair of voltage divider resistors 100 and 101 are connected in series between transducer line 26 and −10 volts DC. The junction between resistor 100 and 101 is connected through a diode 103 to the base of transistor 40. The collector of the transistor is connected through a resistor 105 to +10 volts potential, while the base electrode is connected through a biasing resistor 107 to the same +10 volts DC. The emitter electrode is connected directly to line 42, and through an emitter resistor 109 to ground 75.

In operation, transistor 40 of stage 32 is nonconducting for flap angles from 0° through 10°, causing the voltage output curve 52 to be substantially at ground potential. At a point 112 beyond the discrete 10° flap position, the junction between resistors 100 and 101 becomes positive by an amount exceeding the required voltage drop across diode 103 and the base-emitter junction of transistor 40. As a result, the voltage at the base electrode becomes sufficiently positive to forward bias transistor 40 and cause it to operate in its conductive region. This produces a ramp-shaped conduction curve which forces current through the emitter resistor 109, producing a voltage drop which causes the voltage on line 42 to rise positively. At a voltage point 115, transistor 40 is driven into its saturated conduction state, maintaining thereafter the steady state voltage output of approximately +1 volts DC.

The ramp voltage between points 112 and 115 is chosen to fall between adjacent discrete values of flap position, for the same reason as previously explained for the ramp between points 90 and 92 of curve 50. The operation of stage 33 is substantially the same as that for stage 32, except the resistance of resistors 100 and 101 are chosen so that the point at which its transistor 40 is first driven into conduction is delayed sufficient so that the ramp falls between the discrete flap positions of 20° and 30 °. The stages 32 and 33 are temperature compensated by the base input diode 103 which compensates for the base-to-emitter voltage drop across the conducting transistor 40.

Summers 60 and 64 individually add the voltage waveforms 50 through 53 in order to form separate reference programs. Each summer has a similar circuit, with different component values being used in order to weight each input waveform differently in order to alter the plateau voltage levels of the reference program generated thereby. Summer 60 will be explained in detail. A plurality of resistors 120 are individually connected between each output line 42 of stages 30–33 and a common summing junction 122. To invert the voltage at junction 122, an operational amplifier 125 has its (−) input connected to junction 122, and its output connected directly to the output line 61. A feedback resistor 127 is connected between line 61 and the (−) input. The (+) input of the operational amplifier is connected through a resistor 130 to ground 75. To adjust the basic level of the reference program, a bias resistor 132 is connected between summing junction 122 and a potential line 133 which carries a reference DC-bias voltage.

Concerning the values of the components, the resistance value of each resistor 120 is chosen so that its corresponding voltage curve contributes the desired level of voltage to the reference program. The steady state regions of the voltage curves 50–53 form the plateau regions 14 in the final reference program. The ramp shaped transition areas form the transition regions 15 in the final program. The overall level of the final reference program is controlled by selection of an appropriate value for bias resistor 132.

The resistors 120 for summer 64 have different values than the resistors 120 for summer 60, in order to provide different weights to the voltage curves 50 to 53 in order to form a different reference program output on line 65. As illustrated, the values of resistors 120 of summer 60 were chosen to form on line 61 a climbout program while the values of resistors 120 of summer 64 were chosen to form on line 65 an approach program. The output resistance of each of the stages 30–33 is made sufficient low, by the feed back resistor 82 and clamping diode 79 of stages 30 and 31, and the low value of the emitter resistor 109 in stages 32 and 33, so that adjustment of the resistors 120 for one summer does not significantly alter the reference program generated by the other summer. Thus, interacting resistor networks have been eliminated.

The program generator of FIG. 2 is the preferred form for implementing the invention. In place of the illustrated program generator, a conventional resister divider diode function generator could be connected to the analog transducer 20 and still provide a reference program with smoothly controlled values during flap changes. A reference program produced by such a function generator would have the form illustrated in FIG. 1B. While the smooth, continuous form of the program curve approaches an idea program from the aerodynamic standpoint, variations in the resting or discrete positions of the flaps cause undesirable system variations. It is preferred that each discrete flap position have a plateau region 14 associated therewith, which do not occur in the FIG. 1B program. Also, separate diode function generators would have to be provided for each program to be generated. For these reasons, the circuit of FIG. 2 is preferred over a conventional function generator connected to an analog transducer.

I claim:

1. In an aircraft having a control surface movable to different positions to control an aircraft flight condition, a reference program generator for generating a reference program correlating control surface position to a desired aircraft flight condition, comprising:
    transducer means associated with said control surface for generating an analog signal having a continuously variable quantity representing the position of said control surface; and
    program means coupled to said transducer means for generating a reference signal having points corresponding to discrete positions of said control surface as represented by predetermined analog signal quantities, including
    transition means for causing said reference signal to have a nonperpendicular skewed transition region between said points.

2. The reference program generator of claim 1 wherein said transition means causes said reference signal to have substantially flat plateau regions about each of a plurality of said points, the nonperpendicular skewed transition regions occurring between plateau regions.

3. The reference program generator of claim 2 wherein said transition means causes said points to be located in the midsections of said substantially flat plateau regions.

4. The reference program generator of claim 1 wherein said transition means includes a plurality of stages each including switching means responsive to a different predetermined analog signal quantity for generating a switching signal, and wherein said program means further includes means for combining said switching signals to form said reference signal.

5. The reference program generator of claim 4 wherein each switching means includes a controllable device for varying the switching signal level when actuated, and bias means connecting said controllable devices to said transducer means to actuate the device associated with a given switching means when the analog signal exceeds the predetermined quantity for that switching means.

6. The reference program generator of claim 5 wherein said controllable devices comprise transistors having a variable conduction region, said bias means operating said transistors in said conduction region when the transistors are actuated.

7. The reference program generator of claim 5 wherein said combining means includes a plurality of impedance means each coupled to a different one of said plurality of stages, and circuit means connected to said impedance means to sum the switching signals in order to form said reference signal.

8. The reference program generator of claim 7 wherein each impedance means comprises a resistor, said circuit means comprises a common summing point for said resistors and amplifying means connected to said summing point for generating said reference signal.

9. In an aircraft having a control surface movable to different positions to control an aircraft flight condition, a reference program generator for generating a reference program correlating control surface position to a desired aircraft flight condition, comprising:
    transducer means associated with said control surface for generating a signal representing the positions of said control surface;
    generating means coupled to said transducer means for generating a plurality of separate signals, each signal having a discontinuity at a different point; and
    a plurality of program means each connected to said generating means for combining differently the separate signals to generate a plurality of different reference program signals.

10. The reference program generator of claim 9 wherein each program means includes a summing point and a plurality of impedance means coupling the separate signals from said generating means to the summing point, at least one of the impedance means of each program means having a different impedance value than a corresponding impedance means of the other program means in order to sum differently the separate signals.

11. The reference program generator of claim 9 wherein said transducer means generates an analog signal having a continuously variable quantity representing the position of said control surface, and said generating means comprises a plurality of stages coupled to said transducer means and each including switching means responsive to a different predetermined analog signal quantity to form the signal discontinuities in the separate signals.

12. The reference program generator of claim 11 wherein said separate signals each have a pair of discontinuities with a variable ramp region therebetween, said program means being responsive to the ramp regions to form nonperpendicular skewed transitions in said reference program signals.

* * * * *